(12) United States Patent
Graumann

(10) Patent No.: US 10,972,249 B1
(45) Date of Patent: Apr. 6, 2021

(54) SYSTEM AND METHOD FOR DATA SAMPLER DRIFT COMPENSATION

(71) Applicant: Microchip Technology Inc., Chandler, AZ (US)

(72) Inventor: Peter John Waldemar Graumann, Calgary (CA)

(73) Assignee: Microchip Technology Inc., Chandler, CA (US)

( * ) Notice: Subject to any disclaimer, the term of this patent is extended or adjusted under 35 U.S.C. 154(b) by 0 days.

(21) Appl. No.: 17/022,480

(22) Filed: Sep. 16, 2020

Related U.S. Application Data

(60) Provisional application No. 63/012,586, filed on Apr. 20, 2020.

(51) Int. Cl.
*H04L 7/00* (2006.01)
*H04L 25/03* (2006.01)

(52) U.S. Cl.
CPC .......... *H04L 7/0058* (2013.01); *H04L 7/0087* (2013.01); *H04L 25/03057* (2013.01)

(58) Field of Classification Search
CPC ............................ H04L 7/0058; H04L 7/0087
See application file for complete search history.

(56) References Cited

U.S. PATENT DOCUMENTS

| | | | |
|---|---|---|---|
| 8,971,396 B1 | 3/2015 | Bates et al. | |
| 9,860,089 B2 | 1/2018 | Lee et al. | |
| 10,230,552 B1 | 3/2019 | Graumann | |
| 10,505,707 B2 | 12/2019 | Graumann | |
| 2010/0238993 A1 | 9/2010 | Huang et al. | |
| 2010/0329322 A1 | 12/2010 | Mobin et al. | |
| 2016/0127155 A1 | 5/2016 | Johnson et al. | |
| 2017/0005841 A1 | 1/2017 | Komori et al. | |
| 2018/0167240 A1 | 6/2018 | Li et al. | |

*Primary Examiner* — Curtis B Odom
(74) *Attorney, Agent, or Firm* — Glass and Associates; Molly Sauter; Kenneth Glass

(57) ABSTRACT

A system and method for data sampler drift compensation in a SerDes receiver. Off-data values are received at a drift compensation engine from a plurality of data value selectors coupled to one of a plurality of data sampler pairs of a speculative Decision Feedback Equalizer (DFE) of a SerDes receiver. A drift compensation value for each of the data samplers is generated by the drift compensation engine based upon the off-data values received from each of the plurality of data value selectors and, a sampling level of each of the data samplers of the plurality of data sampler pairs of the DFE is adjusted based upon the drift compensation value from the drift compensation engine.

22 Claims, 8 Drawing Sheets

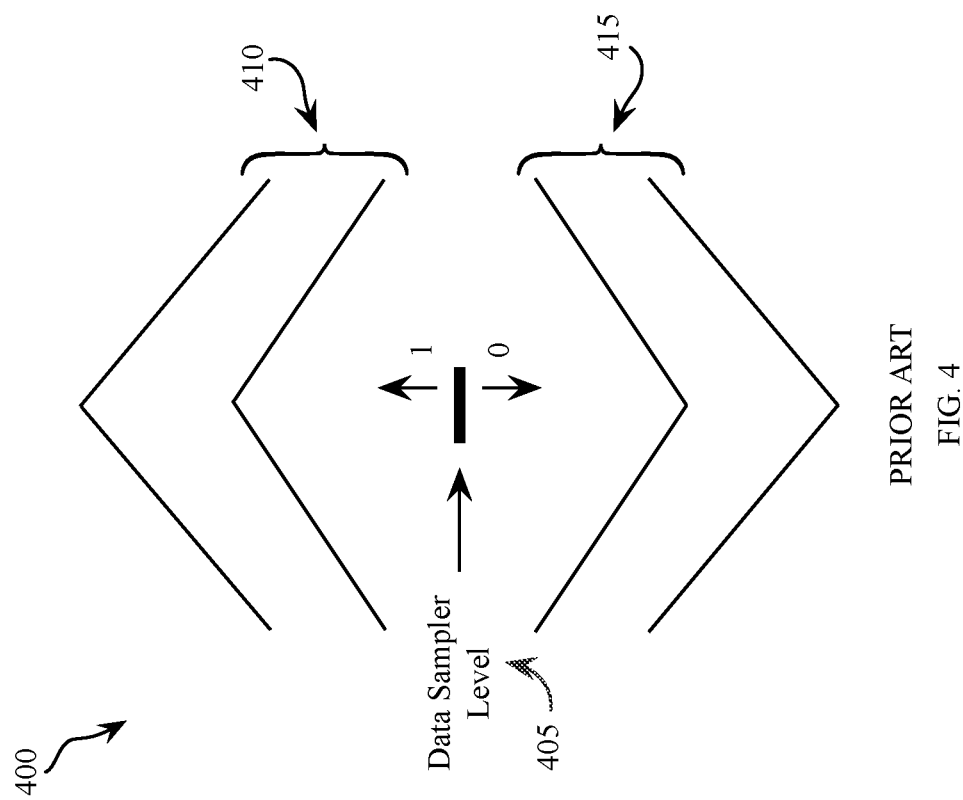

600

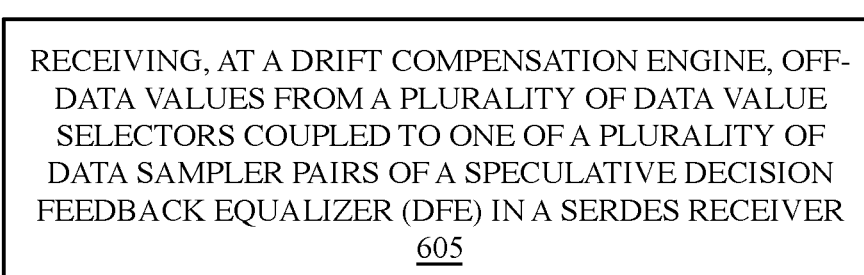

RECEIVING, AT A DRIFT COMPENSATION ENGINE, OFF-DATA VALUES FROM A PLURALITY OF DATA VALUE SELECTORS COUPLED TO ONE OF A PLURALITY OF DATA SAMPLER PAIRS OF A SPECULATIVE DECISION FEEDBACK EQUALIZER (DFE) IN A SERDES RECEIVER
605

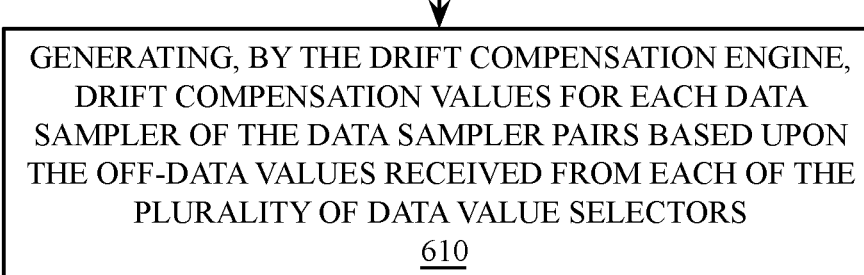

GENERATING, BY THE DRIFT COMPENSATION ENGINE, DRIFT COMPENSATION VALUES FOR EACH DATA SAMPLER OF THE DATA SAMPLER PAIRS BASED UPON THE OFF-DATA VALUES RECEIVED FROM EACH OF THE PLURALITY OF DATA VALUE SELECTORS
610

805 DEFINING A PERIOD OVER WHICH THE ONE-ZERO BIAS VALUE WILL BE DETERMINED

810 TRACKING THE OFF-DATA VALUES OVER THE DEFINED PERIOD BY COUNTING IN A FIRST DIRECTION WHEN THE RECEIVED OFF-DATA VALUE IS A LOGIC LEVEL 1 AND COUNTING IN A SECOND DIRECTION, OPPOSITE THE FIRST DIRECTION, WHEN THE RECEIVED OFF-DATA VALUE IS A LOGIC LEVEL 0 TO DETERMINE THE ONE-ZERO BIAS VALUE FOR EACH DATA SAMPLER

815 AVERAGING THE ONE-ZERO BIAS VALUES OF EACH OF THE DATA SAMPLERS

820 ADJUSTING A SAMPLING LEVEL OF ONE OR MORE OF THE DATA SAMPLERS BASED UPON THE DRIFT COMPENSATION VALUE COMPUTED FOR EACH OF THE DATA SAMPLERS, WHEREIN THE DRIFT COMPENSATION VALUE INDICATES AN INCREASE IN THE SAMPLING LEVEL OF THE DATA SAMPLER IF THE ONE-ZERO BIAS OF THE DATA SAMPLER IS HIGHER THAN THE ONE-ZERO BIAS TARGET VALUE AND THE DRIFT COMPENSATION VALUE INDICATES A DECREASE IN THE SAMPLING LEVEL OF THE DATA SAMPLER IF THE ONE-ZERO BIAS OF THE DATA SAMPLER IS LOWER THAN THE ONE-ZERO BIAS TARGET VALUE

FIG. 8

SYSTEM AND METHOD FOR DATA SAMPLER DRIFT COMPENSATION

CROSS-REFERENCE TO RELATED APPLICATIONS

The present application claims priority to U.S. Provisional Patent Application Ser. No. 63/012,586, filed on Apr. 20, 2020, the contents of which are incorporated by reference herein in their entirety.

BACKGROUND OF THE INVENTION

Analog Serializer/Deserializer (SerDes) receivers used in high-speed communication systems, are designed to sample an analog waveform and then reliably detect the sampled data. SerDes receivers utilize multiple data samplers, such as 1-bit Analog-to-Digital converters, to regularly sample incoming analog signals and to convert the samples to digital values. In operation, the sampling level of each of these data samplers is calibrated during startup and cannot be subsequently re-calibrated during live traffic operations. However, during operation, the data samplers of the SerDes receiver are subject to voltage and temperature (VT) changes which may result in drift in the sampling level of the data samplers. The drift of the sampling level of the data samplers due to changing VT conditions is a potential source of undesirable bit-errors. Adjustment, or trimming, of the sampling level of the data samplers is required to optimize receiver performance during dynamic changes in VT conditions.

It is known in the art to provide duplicate receiver circuitry, operating in parallel, wherein one receiver processes live traffic while the other receiver performs standard calibration procedures, and periodically exchanging the function of these two receivers. However, utilizing duplicate receiver circuitry requires significant area and increases power consumption, and is therefore not a feasible solution in many applications. Placing completely, or partially, redundant receivers in a SerDes device is not acceptable from a power or area perspective.

Additionally, it is known in the art to use Forward-Error-Correction (FEC) feedback to correct data sampler VT-drift errors. Utilizing FEC feedback, if a data sampler has drifted to a sampling location that results in bit-errors in the received data stream, the bit-errors are detected by the FEC and correction statistics are collected for each data sampler. The correction statistics are then used to correct the VT drift condition of the data sampler. However, some standards, including PCI Express (PCIe) Gen5, promulgated by the Peripheral Component Interconnect Special Interest Group (PCI-SIG), of Beaverton, Oreg., are designed without the use of FEC, thereby eliminate the ability to use FEC to correct the data sampler VT-drift. Leaving the drift uncompensated, as is currently done in many receivers, is not viable at modern data rates.

Accordingly, what is needed in the art is an improved system and method for adjusting the sampling level of data samplers in a SerDes receiver in response to dynamic operating conditions, such as changes in voltage and temperature during operation of the receiver.

SUMMARY OF THE INVENTION

In various embodiment, the present invention provides a system and method for data sampler drift compensation in a serializer/deserializer (SerDes) receiver, wherein the data sampler drift may be due to voltage or temperature (VT) drift. Reducing the data sampler drift reduces the bit-errors at the SerDes receiver.

In one embodiment, the method of the present invention includes receiving, at a drift compensation engine, off-data values from a plurality of data value selectors, each one of the plurality of data value selectors coupled to one of a plurality of data sampler pairs of a speculative Decision Feedback Equalizer (DFE) in a SerDes receiver. The method further includes generating, by the drift compensation engine, a drift compensation value for each of the data samplers based upon the off-data values received from each of the plurality of data value selectors. In the present invention the off-data values are the speculative data values that were not selected by the data value selector because the assumed value of the previously received bit that was used to determine the speculative data value was subsequently determined to be incorrect.

In a particular embodiment, the drift compensation value is generated by determining a one-zero bias value for each data sampler of the plurality of data sampler pairs using the off-data values, determining a one-zero bias target value using the one-zero bias values for each data sampler determined by the drift compensation engine and then determining the drift compensation value for each of the data samplers based upon the one-zero bias target value and the one-zero bias value of each data sampler.

In an additional embodiment, the method further includes, identifying and removing the off-data values that do not provide useful information for determining the one-zero bias value prior to determining the one-zero bias value.

The present invention additionally provides a system for data sampler drift compensation in a Serializer/Deserializer (SerDes) receiver. The system includes, a plurality of data value selectors, wherein each one of the plurality of data value selectors are coupled to one of a plurality of data sampler pairs of a speculative Decision Feedback Equalizer (DFE) in a SerDes receiver, the plurality of data value selectors to identify off-data values from speculative data values provided by the data sampler pairs. The system further includes a drift compensation engine coupled to the plurality of data value selectors, the drift compensation engine to receive the off-data values from the plurality of data value selectors and to determining a drift compensation value for each of the data samplers of each data sampler pair based upon the off-data values received from each of the plurality of data value selectors.

In another embodiment, the system is further configured to determine a one-zero bias value for each data sampler of the plurality of data sampler pairs of the speculative DFE using the off-data values, to determine a one-zero bias target value using the one-zero bias values determined for each data sampler and to determine the drift compensation value for each of the data samplers based upon the one-zero bias target value and the one-zero bias value of each data sampler.

In a particular embodiment, each of the data value selectors of the system includes a first multiplexer circuit for identifying data values from speculative data values of a serial bit stream received from a data sampler pair coupled to the data value selector and a previous bit value of the serial bit stream and a second multiplexer circuit for identifying the off-data values from the speculative data values of the serial bit stream received from the data sampler pair coupled to the data value selector and the previous bit value of the serial bit stream.

In another embodiment, a system for data sampler drift compensation in a Serializer/Deserializer (SerDes) receiver includes a speculative Decision Feedback Equalizer (DFE) of the SerDes receiver, the speculative DFE comprising a plurality of data sampler pairs and a data sampler selector coupled to each of the plurality of data sampler pairs. The system further includes a drift compensation engine coupled to the SerDes receiver, the drift compensation engine to receive off-data values from the data sampler selectors and to provide a drift compensation value to each data sampler of the DFE, wherein the drift compensation value is based upon the speculative data values received from the data sampler selectors. In this system, the SerDes receiver is configured to adjust a sampling voltage of each of the data samplers of the plurality of data sampler pairs of the DFE based upon the drift compensation value from the drift compensation engine.

Accordingly, in various embodiments, the present invention provides an improved system and method for adjusting the sampling level of data samplers in a SerDes receiver in response to sampling level drift resulting from dynamic operating conditions, such as changes in voltage and temperature during operation of the receiver.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4 is a diagram illustrating a receiver eye and associated sampling level for data values, as is commonly known in the art.

FIG. 6 is a flow diagram illustrating a method for drift compensation in a SerDes receiver, in accordance with an embodiment of the present invention.

FIG. 8 is a flow diagram illustrating a method for determining a one-zero bias value for each data sampler of the plurality of data sampler pairs using the off-data values, in accordance with an embodiment of the present invention.

DETAILED DESCRIPTION OF THE INVENTION

Figure 1:
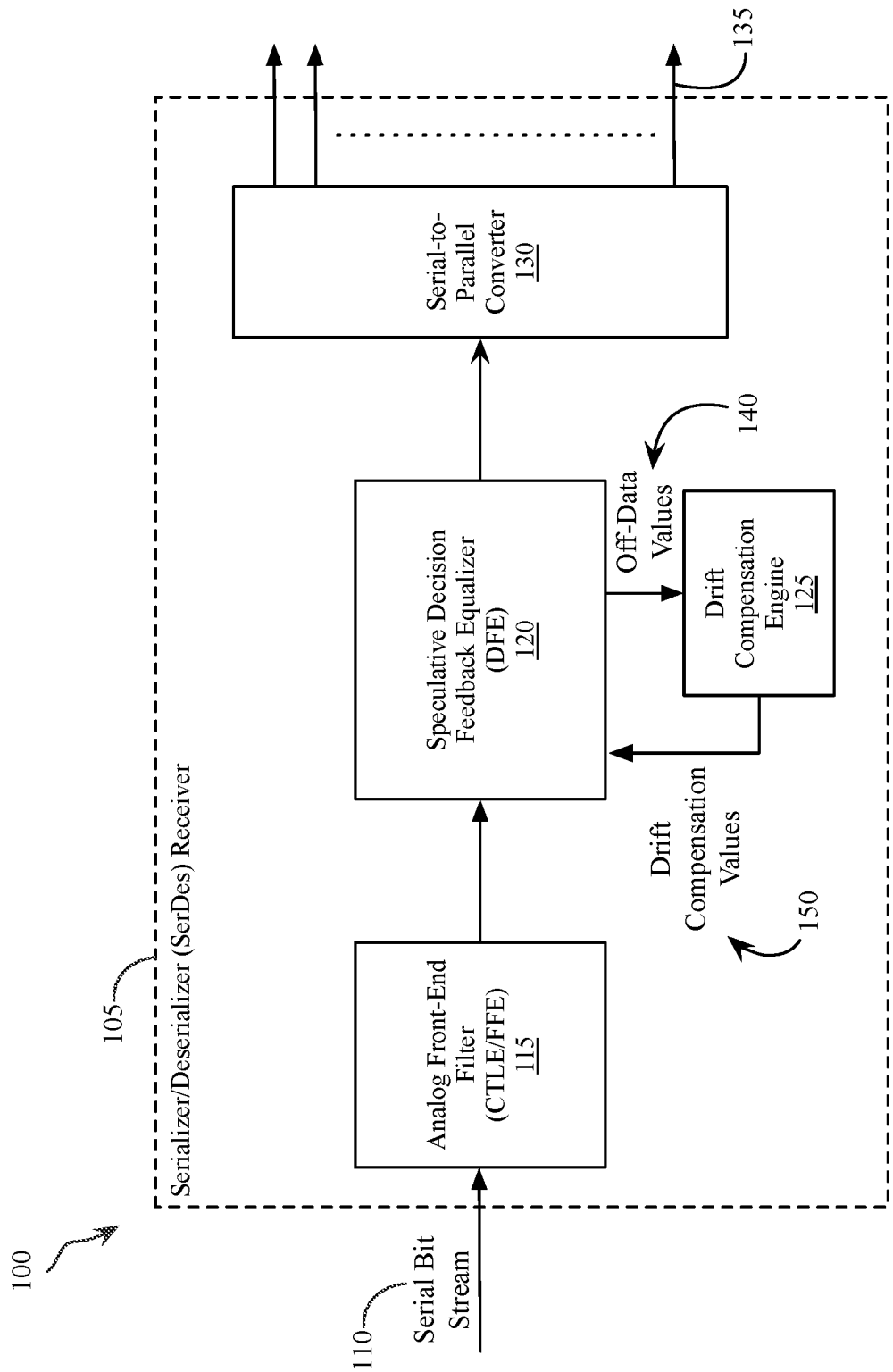
FIG. 1 is a block diagram illustrating a system for drift compensation in a SerDes receiver, in accordance with an embodiment of the present invention.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A SerDes receiver includes a plurality of data samplers. Each data sampler of the SerDes receiver is set to a given sampling voltage or sampling level. Any input signal received at a data sampler that is higher than the sampling level of the data sampler at the time of sampling will be deemed to be a logic "1", while any input signal that is lower than the sampling level of the data sampler at the time of sampling will be deemed to be a logic "0". The ideal sampling voltage or sampling level for each sampler is obtained after careful calibration steps, which are generally performed during startup operations of the SerDes receiver and before any data traffic is flowing to the receiver. Such calibration operations are impacted by changes in an applied supply voltage or in the operating temperature of the receiver. Additionally, the sensitivity to changes in voltage and temperature increases as the geometry of the receiver is reduced.

In accordance with various embodiments of the present invention, an improved system and method for adjusting the sampling level of data samplers in a SerDes receiver in response to dynamic changes in voltage and temperature during operation of the receiver are provided. In particular, the present invention provides a system and method for drift compensation in a SerDes receiver using the receiver's speculative decision feedback equalizer (DFE). Since the present invention uses the receiver's existing speculative DFE, the cost of implementing the drift compensation method of the present invention, in terms of area, power and complexity, is very low.

In high-speed SerDes implementations, a lossy communication channel exists between the transmitter and the receiver, and at high data rates, the received data stream may be severely distorted, thereby requiring equalization before the received data can be effectively sampled. An effective way for equalizing channel loss and for negating the impact of intersymbol interference (ISI) is to implement a decision feedback equalizer (DFE) in the receiver.

A DFE uses previously decided bits or decisions on past samples to equalize the channel. In a receiver DFE, the previously decided bits are fed back with weighted tap coefficients and added to the received input signal. The weighted tap coefficients are adjusted to match the channel characteristics, thereby cancelling the ISI from the previous bits in the data stream and allowing the data samplers to detect the bits with a low bit error rate. However, a major challenge in the design of DFEs operating at multi-gigabits-per-second is ensuring that a determination of the previous bit has been made before the next decision needs to be made. This restrictive timing requirement of the DFE feedback loop can be eased by utilizing a speculative, or unrolled, DFE. Speculative DFEs are known in the art for equalizing channel loss. A speculative DFE includes a plurality of threads connected in series, wherein each of the plurality of threads includes a pair of interleaved data samplers and a data value selector. Typically, the number of threads in a speculative DFE is between 2 and 8 and is normally a power of 2. The pair of interleaved data samplers of a speculative DFE samples the input signal and pre-calculates two competing adjustment feedback values to equalize the channel. This pre-calculation of the adjustment feedback values eliminates inherent timing constraints that result from the need to wait for the value of a previously received bit to be determined. One of the data samplers of the interleaved data sampler pair determines a value of a current bit of a data stream based on a speculation that the result from processing the previously received bit will be a logic "1" and the other data sampler determines a value of a current bit based on a speculation that the result from processing the previously received bit will be a logic "0". Once the actual result of the previously received bit is available, the pre-calculated adjustment feedback value that corresponds to the correctly speculated value is selected and used to process a following bit. Accordingly, a speculative DFE reduces the latency between the determination of a previously received bit and the determination of a currently received bit of a data stream in the feedback loop of the DFE.

As previously described, in a speculative DFE, each data sampler of a pair of interleaved data samplers in a thread of the speculative DFE provides a speculative value to a data value selector based upon an assumption that a previously received bit was one of two opposite logic levels. The correct value of the speculative values is subsequently selected by the data value selector after the previously received bit is determined. The speculative value that is selected by the data value selector as the correct value is then forwarded to a next thread of the speculative DFE. Additionally, in the SerDes receivers known in the art employing speculative DFEs, the speculative value that is not selected by the data value selector as the correct value based upon the previously received bit is subsequently discarded. In the following description, the data value selected by the data value selector as the correct value will be referred to as the "data value" and the unselected data value will be referred to as the "off-data value".

In contrast with the prior art, in the present invention, the off-data value is not discarded by the speculative DFE but is instead used to perform drift compensation for the data samplers of the SerDes receiver.

With reference to FIG. 1, a system 100 for data sampler drift compensation in a Serializer Deserializer (SerDes) receiver 105, includes a speculative decision feedback equalizer (DFE) 120 and a drift compensation engine 125 coupled to the speculative DFE 120. In operation, the speculative DFE 120 provides off-data values 140 to the drift compensation engine 125 and the drift compensation engine 125 provides drift compensation values 150 to the speculative DFE 120 to compensate for drift in the sampling level of the data samplers of the speculative DFE 120 during operation of the SerDes receiver 105.

The SerDes receiver 105 may further include an analog front-end filter 115 having an output coupled to an input of the speculative DFE 120 and a serial-to-parallel converter 130 coupled to an output of the speculative DFE 120. In operation, the received serial bit stream 110 is passed through the analog front-end filter 115. The analog front-end filter 115 may be implemented in several ways, which may include a continuous time linear equalizer (CTLE) and a feed forward equalizer (FFE) to provide finite impulse response filtering (FIR) for the received serial bit stream 110 in the SerDes receiver 105. After the serial bit stream 110 is filtered by the analog front-end filter 115, the next step performed by the SerDes receiver 105 is decision feedback equalization, where decisions made on previously received bits are combined with DFE coefficients (or tap weights) to remove ISI. The speculative DFE 120 is implemented as an N-tap DFE and as such, the speculative DFE 120 includes one or more taps, wherein a first tap of the speculative DFE is implemented as an unrolled tap to remove the intersymbol interference (ISI) from the serial bit stream 110. For the subsequent taps of the speculative DFE 120, since there is typically adequate time to ensure that a determination of the previous bit has been made before the next decision needs to be made, the subsequent taps of the speculative DFE 120 are preferably implemented in a manner commonly known in the art, wherein the tap is multiplied by a gain value and then subtracted from the input waveform. The fully equalized signal is sampled by the speculative DFE 120 and passed to the serial-to-parallel converter 130 which generates a parallel stream of output data on the output bus 135.

Figure 2:
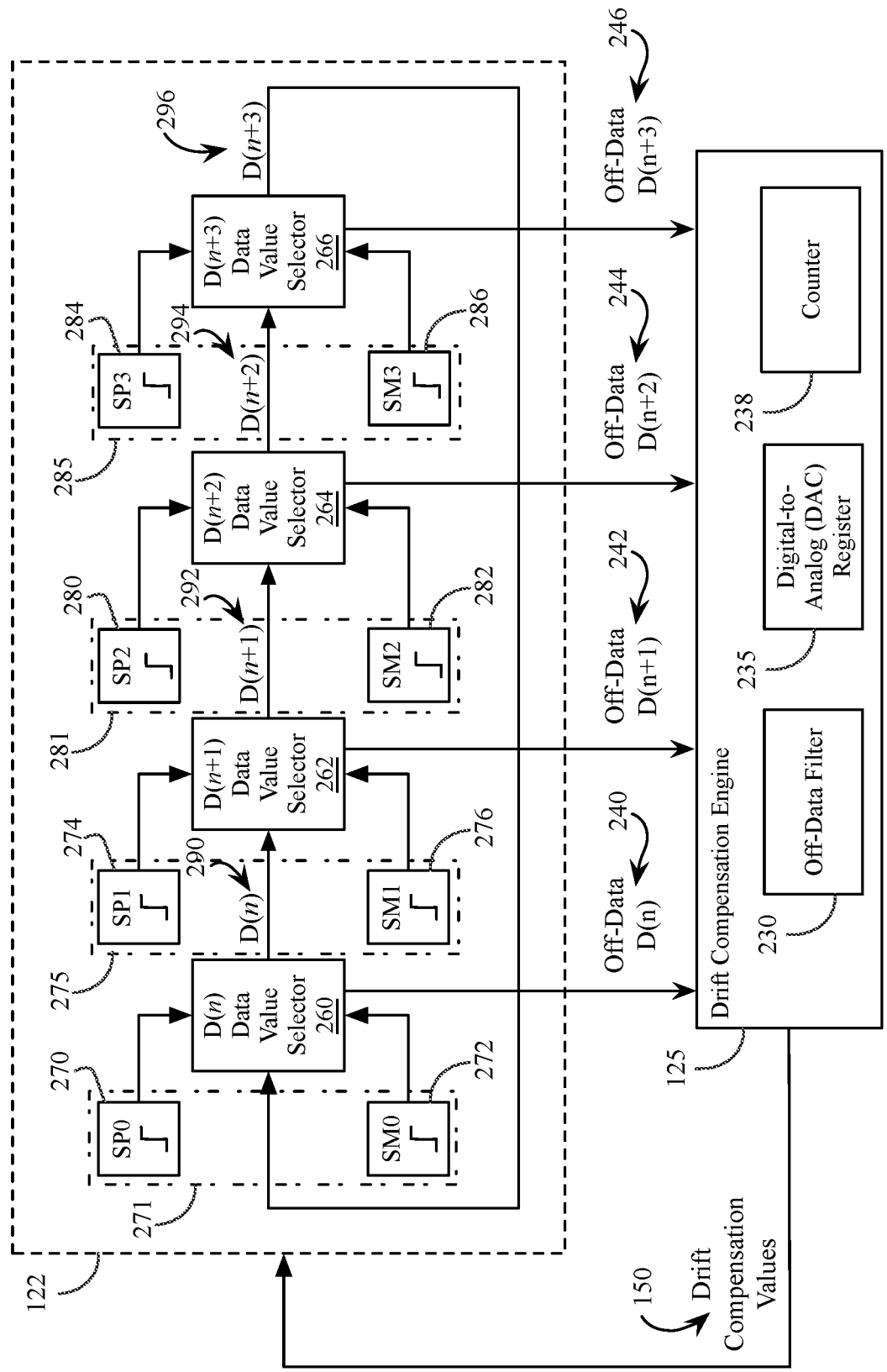
FIG. 2 is a block diagram illustrating a speculative DFE and a drift compensation engine, in accordance with an embodiment of the present invention.

With reference to FIG. 2, the speculative first tap 122 of the speculative DFE 120 of the SerDes receiver 105 of FIG. 1 may further include a plurality of threads, each comprising a pair of data samplers and a data value selector. In this illustrative embodiment, four threads are shown, however this is not intended to be limiting and different numbers of threads are within the scope of the invention. As shown, the speculative first tap 122 includes a plurality of data value selectors 260, 262, 264, 266, and each one of the plurality of data value selectors 260, 262, 264, 266 are coupled to one of a plurality of data sampler pairs 271, 275, 281, 285. In this exemplary embodiment, a first thread of the speculative first tap 122 includes a first data sampler pair 271, first data sampler pair 271 including a first data value selector 270 and a second data value selector 272 each having respective outputs coupled to first data value selector 260. A second thread of the speculative first tap 122 includes a second data sampler pair 275, second data sampler pair 275 including a first data value selector 274 and a second data value selector 276 each having respective outputs coupled to second data value selector 262 and the second data value selector 262 further having an input coupled to an output of the first data value selector 260 of the previous thread. A third thread of the speculative first tap 122 includes a third data sampler pair 281, third data sampler pair 281 including a first data value selector 280 and a second data value selector 282 each having respective outputs coupled to a third data value selector 264 and the third data value selector 264 further having an input coupled to an output of the second data value selector 262 of the previous thread. A fourth thread of the speculative first tap 122 includes a fourth data sampler pair 285, fourth data sampler pair 285 including a first data value selector 284 and a second data value selector 286 each having respective outputs coupled to a fourth data value selector 266 and the fourth data value selector 266 further having an input coupled to an output of the third data value selector 264 of the previous thread. Fourth data value selector 266 has an output coupled to an input of first data value selector 260. In the present invention, the plurality of data value selectors 260, 262, 264, 266 are used to identify data values 290, 292, 294, 296 and off-data values 240, 242, 244, 246 from the speculative data values provided by the data sampler pairs 271, 275, 281, 285, as described in more detail below.

The drift compensation engine 125 is coupled to the plurality of data value selectors 260, 262, 264, 266 and the drift compensation engine is configured to receive the off-data values 240, 242, 244, 246 from the plurality of data value selectors 260, 262, 264, 266 and is further configured to generate respective drift compensation values 150 for each of the data samplers of each data sampler pair 271, 275, 281, 285 based upon the off-data values 240, 242, 244, 246 received from each of the plurality of data value selectors 260, 262, 264, 266.

In the exemplary embodiment illustrated in FIG. 2, the first thread of the speculative first tap 122 includes first data sampler pair 271 having first data sampler 270 and second data sampler 272. The first thread further includes, first data value selector 260 coupled to receive the speculative data values from the data samplers 270, 272 of the first data sampler pair 271. The second thread of the speculative first tap 122 includes second data sampler pair 275 including two data samplers 274, 276 and second data value selector 262 coupled to receive the speculative data values from the data samplers 274, 276. The third thread of the speculative first tap 122 includes third data sampler pair 281 including two data samplers 280, 282 and third data value selector 264 coupled to receive the speculative data values from the data samplers 280, 282. The fourth thread of the speculative first tap 122 includes fourth data sampler pair 285 including two data samplers 284, 286 and fourth data value selector 266 coupled to receive the speculative data values from the data samplers 284, 286.

In operation of the speculative first tap 122 of the speculative DFE 120, alternating data sampler pairs are used to sample the serial bit stream 110 to generate speculative data values, wherein the speculative data values are based upon an assumption that a previously received bit was determined to be either a logic "1" or a logic "0". In particular, the data sampler pairs 271, 275, 281, 285 take turns sampling the serial bit stream 110, so that each data sampler pair 271, 275, 281, 285 collects ¼ of the bits from the serial bit stream 110. While FIG. 2 illustrates 4 time periods (n) for the data sampling, it is understood that the process continues over a duration of more that 4 time periods. In general, data sampler pair 271 samples the serial bit stream at times D(m), data sampler pair 275 samples the serial bit stream at time D(m+1), data sampler pair 281 samples the serial bit stream at time D(m+2) and data sampler pair 285 samples the serial bit stream at time D(m+3), where m is a positive integer that increments by 4 after every 4th serial bit stream sample is taken.

For example, at a first time (n) each of the data samplers 270, 272 of the first data sampler pair 271 may sample the serial bit stream 110 to generate a speculative data value for a current bit D(n), wherein the first data sampler 270 of the first data sampler pair 271 may generate the speculative data value assuming that a previously received bit from the serial bit stream 110 is a logic "1" and the second data sampler 272 of the first data sampler pair 271 may generate the speculative data value assuming that a previously received bit from the serial bit stream 110 is a logic "0". Both of the data samplers 270, 272 then provide the speculative data value they generated from the serial bit stream 110 to the first data value selector 260. After a previously determined data value D(n+3) 296 has been received at the first data value selector 260 from the fourth data value selector 266, the first data value selector 260 will determine which of the speculative data values is the correct value. For example, if D(n+3) 296 is determined to be a logic "1", then the first data value selector 260 will determine that the speculative data value provided by the first data sampler 270 of the first data sampler pair 271 is the correct data value D(n) 290 because the first data sampler 270 generated the speculative data value under the assumption that the previously received bit was a logic "1". Alternatively, if D(n+3) 296 is determined to be a logic "0", then the first data value selector 260 will determine that the speculative data value provided by the second data sampler 272 of the first data sampler pair 271 is the correct data value D(n) 290 because the second data sampler 272 of the first data sampler pair 271 generated the speculative data value under the assumption that the previously received bit was a logic "0". The selected data value D(n) 290 is then provided to the second data value selector 262 of the next thread of the first tap 122 and the unselected data value off-data D(n) 240 is provided to the drift compensation engine 125.

At a next time (n+1) each of the data samplers 274, 276 of the second data sampler pair 275 may sample the serial bit stream 110 to generate a speculative data value for a current bit D(n+1) 292, wherein the first data sampler 274 of the second data sampler pair 275 may generate the speculative data value assuming that a previously received bit from the serial bit stream 110 is a logic "1" and the second data sampler 276 of the second data sampler pair 275 may generate the speculative data value assuming that a previously received bit from the serial bit stream 110 is a logic "0". Both of the data samplers 274, 276 then provide the speculative data value they generated from the serial bit stream 110 to the second data value selector 262. After a previously determined data value D(n) 290 has been received at the second data value selector 262 from the first data value selector 260, the second data value selector 262 will determine which of the speculative data values is the correct value. For example, if D(n) 290 is determined to be a logic "1", then the second data value selector 262 will determine that the speculative data value provided by the first data sampler 274 of the second data sampler pair 275 is the correct data value D(n+1) 292 because the first data sampler 274 generated the speculative data value under the assumption that the previously received bit was a logic "1". Alternatively, if D(n) 290 is determined to be a logic "0", then the second data value selector 262 will determine that the speculative data value provided by the second data sampler 276 of the second data sampler pair 275 is the correct data value D(n+1) 292 because the second data sampler 276 of the second data sampler pair 275 generated the speculative data value under the assumption that the previously received bit was a logic "0". The selected data value D(n+1) 292 is then provided to the third data value selector 264 of the next thread of the first tap 122 and the unselected data value off-data D(n+1) 242 is provided to the drift compensation engine 125.

At a next time (n+2) each of the data samplers 280, 282 of the third data sampler pair 281 may sample the serial bit stream 110 to generate a speculative data value for a current bit D(n+2) 294, wherein the first data sampler 280 of the third data sampler pair 281 may generate the speculative data value assuming that a previously received bit from the serial bit stream 110 is a logic "1" and the second data sampler 282 of the third data sampler pair 281 may generate the speculative data value assuming that a previously received bit from the serial bit stream 110 is a logic "0". Both of the data samplers 280, 282 then provide the speculative data value they generated from the serial bit stream 110 to the third data value selector 264. After a previously determined data value D(n+1) 292 has been received at the third data value selector 264 from the second data value selector 262, the third data value selector 264 will determine which of the speculative data values is the correct value. For example, if D(n+1) 292 is determined to be a logic "1", then the third data value selector 264 will determine that the speculative data value provided by the first data sampler 280 of the third data sampler pair 281 is the correct data value D(n+2) 294 because the first data sampler 280 generated the speculative data value under the assumption that the previously received bit was a logic "1". Alternatively, if D(n+1) 292 is determined to be a logic "0", then the third data value selector 264 will determine that the speculative data value provided by the second data sampler 282 of the third data sampler pair 281 is the correct data value D(n+2) 294 because the second data sampler 282 of the third data sampler pair 281 generated the speculative data value under the assumption that the previously received bit was a logic "0". The selected data value D(n+2) 294 is then provided to the fourth data value selector 266 of the next thread of the first tap 122 and the unselected data value, off-data D(n+2) 244 is provided to the drift compensation engine 125.

At a next time (n+3) each of the data samplers 284, 286 of the fourth data sampler pair 285 may sample the serial bit stream 110 to generate a speculative data value for a current bit D(n+3) 296, wherein the first data sampler 284 of the fourth data sampler pair 285 may generate the speculative data value assuming that a previously received bit from the serial bit stream 110 is a logic "1" and the second data sampler 286 of the fourth data sampler pair 285 may generate the speculative data value assuming that a previously received bit from the serial bit stream 110 is a logic "0". Both of the data samplers 284, 286 then provide the speculative data value they generated from the serial bit stream 110 to the fourth data value selector 266. After a previously determined data value D(n+2) 294 has been received at the fourth data value selector 266 from the third data value selector 264, the fourth data value selector 266 will determine which of the speculative data values is the correct value. For example, if D(n+2) 294 is determined to be a logic "1", then the fourth data value selector 266 will determine that the speculative data value provided by the first data sampler 284 of the fourth data sampler pair 285 is the correct data value D(n+3) 296 because the first data sampler 284 generated the speculative data value under the assumption that the previously received bit was a logic "1". Alternatively, if D(n+2) 294 is determined to be a logic "0", then the fourth data value selector 266 will determine that the speculative data value provided by the second data sampler 286 of the fourth data sampler pair 285 is the correct data value D(n+3) 296 because the second data sampler 282 of the fourth data sampler pair 285 generated the speculative data value under the assumption that the previously received bit was a logic "0". The selected data value D(n+3) 296 is then provided to the first data value selector 260 of the first thread of the first tap 122 and the unselected data value, off-data D(n+3) 246 is provided to the drift compensation engine 125.

In the present invention, to compensate for any drift that has occurred in the sampling level of any of the data samplers 270, 272, 274, 276, 280, 282, 284, 286 of the speculative DFE 120, data value selectors 260, 262, 264, 266 are also used to identify the off-data values 240, 242, 244, 246 from the speculative data values provided by the data samplers 270, 272, 274, 276, 280, 282, 284, 286. As previously described, the off-data values 240, 242, 244, 246 are the speculative values that are based on an incorrect assumption of the value of the previously received bit. Expanding on the previous example, if the previously received bit D(n) 290 is determined to be a logic "0", then the second data value selector 262 will determine that the speculative data value provided by the first data sampler 274 is the off-data value (D(n+1)) 242 because the first data sampler 274 generated the speculative data value under the assumption that the previously received bit was a logic "1". Alternatively, if D(n) 290 is determined to be a logic "1", then the second data value selector 262 will determine that the speculative data value provided by the second data sampler 276 is the off-data value (D(n+1)) 292 because the second data sampler 276 generated the speculative data value under the assumption that the previously received bit was a logic "0". In other words, the speculative data value that is generated based upon the incorrect assumption of the value of the previously received bit is determined to be the off-data value by the second data value selector 262. The off-data value 242 is then provided to the drift compensation engine 125 and may be subsequently used to generate respective drift compensation values 150 for each of the data samplers 274, 276 of the second data sampler pair 275.

In general, the data sampler pairs 271, 275, 281, 285 take turns sampling the input signal received at the speculative first tap 122. As previously described, one data sampler of the data sampler pair assumes that the previous bit is a logic "1" and the other data sampler of the data sampler pair assumes that the previous bit is a logic "0" to generate speculative data values. Following the determination of the actual value of the previous bit, the speculative data values identified as the off-data values 240, 242, 244, 246 by the data value selectors 260, 262, 264, 266 are then provided to the drift compensation engine 125. Additionally, the speculative data values identified to be the correct data values D(n) 290, D(n+1) 292, D(n+2) 294 and D(n+3) 296 are provided to the serial-to-parallel converter 130 which generates a parallel stream of output data on the output bus 135.

The drift compensation engine 125 uses these off-data values 240, 242, 244, 246 to generate a respective drift compensation value 150 for each of the data samplers. As will be described in more detail with reference to FIGS. 5A-5D, some of the off-data values 240, 242, 244, 246 provided by data value selectors 260, 262, 264, 266 are not considered to be useful for the determination of the drift compensation values 150. As such, prior to the drift compensation engine 125 computing a one-zero bias target value for the data samplers 270, 272, 274, 276, 280, 282, 284, 286, the off-data values 240, 242, 244 and 246 are filtered to remove the off-data values that are not considered useful for the determination of the drift compensation values 150.

Figure 3:
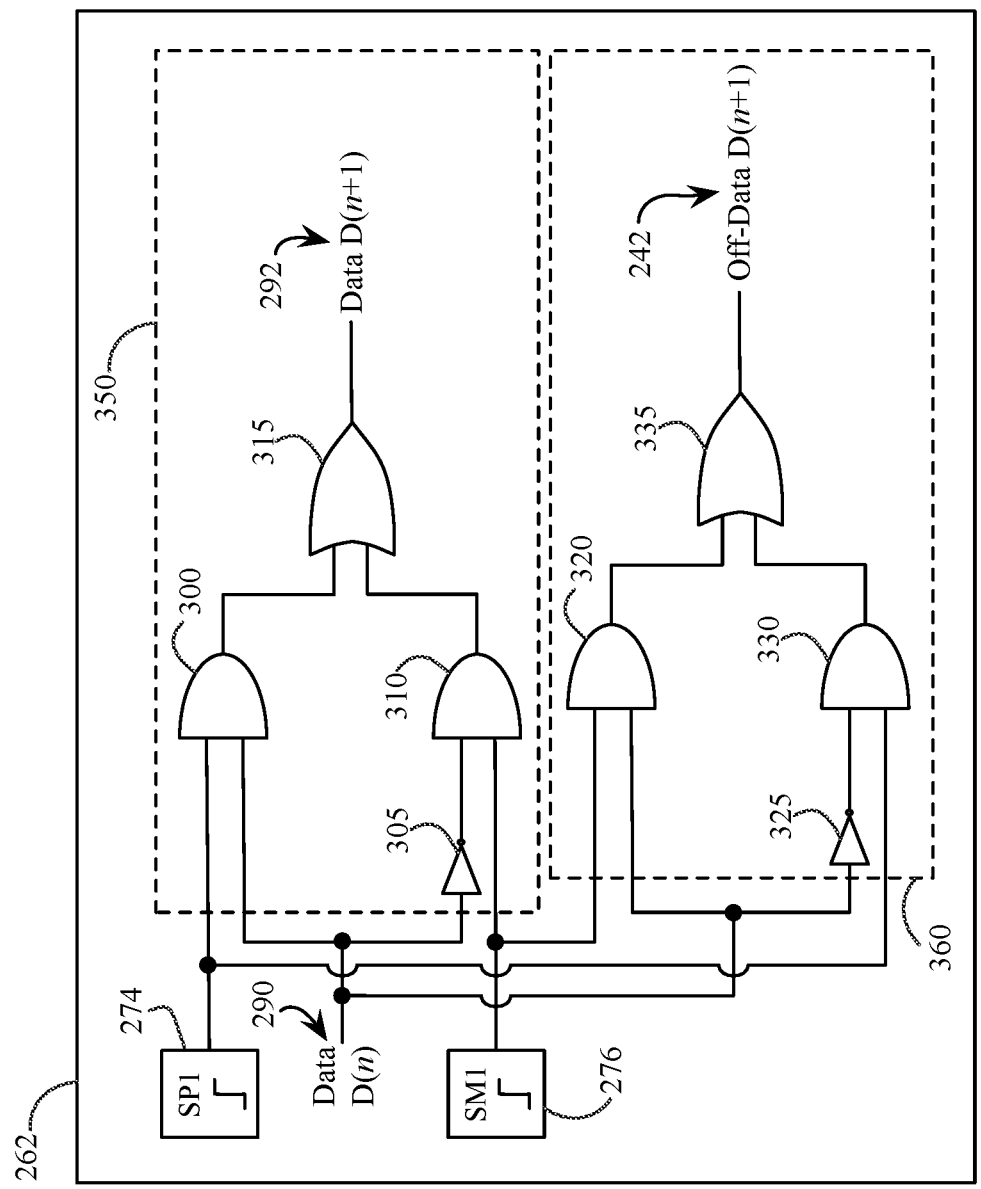
FIG. 3 is a schematic diagram illustrating the operation of the data selectors of the speculative DFE, in accordance with an embodiment of the present invention.

FIG. 3 illustrates the operation of each of the data value selectors 260, 262, 264, 266 in more detail. The circuitry illustrated in FIG. 3 is merely exemplary and numerous other configurations are within the scope of the present invention for accomplishing the functions of the data value selectors 260, 262, 264, 266.

As shown in FIG. 3, an exemplary data value selector 262 in the second thread of the speculative first tap 122 may include a first multiplexer circuit 350 and a second multiplexer circuit 360. The first multiplexer circuit 350 may include a first AND gate 300 having a first input coupled to the output of first data sampler 274 of the second data sampler pair 275 and a second input coupled to the previous data value D(n) 290. The first multiplexer circuit 350 may also include a second AND gate 310 having a first input coupled to the output of second data sampler 276 of the second data sampler pair 275 and a second input coupled to the previous data value D(n) 290 through an inverter 305. The outputs of the first AND gate 300 and the second AND gate 315 are coupled to respective input inputs of a first OR gate 315, which provides the data value D(n+1) 292 to the next thread of the speculative DFE 120. The second multiplexer circuit 360 may include a third AND gate 320 having a first input coupled to the output of the second data sampler 276 of the second data sampler pair 275 and a second input coupled to a previous data value D(n) 290. The second multiplexer circuit 360 may also include a fourth AND gate 330 having a first input coupled to the output of the first data sampler 274 of the second data sampler pair 275 and a second input coupled to the previous data value D(n) 290 through an inverter 325. The outputs of the third AND gate 320 and the fourth AND gate 330 are coupled to respective inputs of a second OR gate 335, which provides the off-data value D(n+1) 242 to the drift compensation engine 125. Accordingly, the first multiplexer circuit 350 of the data value selector 262 is effective in selecting the data value D(n+1) 292 and the second multiplexer circuit 360 of the data value selector 262 is effective in selecting the off-data value D(n+1) 242. Similar circuitry may be provided in the other data value selectors 260, 264, 266 for identifying the off-date values. As indicated above, the drift compensation engine 125 uses the off-data values 240, 242, 244, 246 to generate the drift compensation values 150 for the data samplers.

To determine the drift compensation values 150 that will be used to adjust the sampling level of the data samplers 270, 272, 274, 276, 280, 282, 284, 286, the drift compensation engine 125 first determines a one-zero bias value for each data sampler 270, 272, 274, 276, 280, 282, 284, 286 of the plurality of data sampler pairs 271, 275, 281, 285 of the speculative first tap 122 using the off-data values 240, 242, 244, 246. The drift compensation engine 125 then determines a one-zero bias target value using the one-zero bias values determined for each data sampler 270, 272, 274, 276, 280, 282, 284, 286 and then generates a respective drift compensation value 150 for each of the data samplers 270, 272, 274, 276, 280, 282, 284, 286 based upon the determined one-zero bias target value and the one-zero bias value of each data sampler.

Some of the off-data values 240, 242, 244, 246 provided by data value selectors 260, 262, 264, 266 are not considered to be useful for the determination of the drift compensation values 150. As such, prior to the drift compensation engine 125 determining the one-zero bias target value for the data samplers, the off-data values that are not considered useful for the determination of the drift compensation values 150 are filtered from the off-data values 240, 242, 244, 246. As shown in FIG. 2, the drift compensation engine 125 includes an off-data filter 230 for identifying and removing off-data values that are not considered useful for the determination of the drift compensation values 150. The off-data filter 230 removes the off-data values that are not considered useful, prior to the drift compensation engine 125 determining the one-zero bias target value for the data samplers. In one embodiment, the determining is done by computing.

Off-data values are only considered useful when they can be used to calculate useful statistics regarding data sampler drifting. To be useful, off-data values should preferably be located within a transition portion of the received eye of the input signal, but in some cases, the off-data value itself is located well outside the eye. The transition portion is where the received signal should appear, with high probability, as explained below.

A prior art SerDes eye diagram 400 is illustrated in FIG. 4. With reference to FIG. 4, the SerDes eye diagram 400 includes an upper eye portion 410 and a lower eye portion 415 and in order to sample an input signal at the SerDes receiver, a data sampler level 405 is positioned at the center of the nominal SerDes receiver eye diagram 400. The upper eye portion 410 and lower eye portion 415 represent the transition portion. During each sampling period, the data sampler level 405 converts the analog input signal to either a one, if the sample of the analog input signal is above the data sampler level 405, or to a zero, if the sample of the analog input signal is below the data sampler level 405. Additionally, the sample of the analog input signal may be substantially equal to the data sampler level 405, such as within a few mV, depending upon the specific implementation. The output of the data sampler is determined to be effectively random when the sample of the analog input signal is substantially equal to the data sampler level 405. As such, the data sampler level 405 is used by the respective data samplers 270, 272, 274, 276, 280, 282, 284, 286 to provide a plurality of converted analog input signal samples and a shift register is positioned to collect the converted analog input signal samples as they are provided responsive to the data sampler level 405.

In general, the DFE coefficient (A1) for a first tap of a DFE is considered to be a positive value. It is known in the art that the first tap coefficient (A1) for a first DFE tap is a positive value for any interesting channel that requires drift compensation. In very short channels, the first tap coefficient may be zero or possibly even negative, however, for such short channels drift compensation is not required because the eye of the received signal is known to be large. As the length of the channel and the associated channel insertion loss increases, the value of the first tap coefficient also increases. The first DFE tap is a positive value, meaning that some amount of residual ISI from the previous data sample $D(n-1)$ exists within the received signal at time $D(n)$, the amount of residual ISI from the previous data sample being identified as A1 mV*$D(n-1)$. A1 is a positive voltage adaptively selected by the receiver for any given channel to remove residual ISE, denoted here in millivolts (mV) and $D(n-1)$ is taken to be +1 if $D(n-1)$ was a logic "1" and −1 if $D(n-1)$ was a logic "0". As such, the first data sampler of a data sampler pair which assumes that the previously received bit was a logic "1" and as such, its data sampler level 405 is determined to be +A1 mV and the data sampler level 405 of second data sampler of the data sampler pair which assumes that the previously received bit was a logic "0" is determined to be at −A1 mV. In general, the first data samplers 270, 274, 280, 284 assume that the previously received bit was a logic "1", and hence its data sampler level 405 is located at +A1 mV and the second data samplers 272, 276, 282, 286 assume that the previously received bit was a logic "0", and hence its data sampler level 405 is located at −A1 mV. A1 is a voltage of typically 20 mV to 100 mV, depending upon receiver conditions, for receivers at the time of writing. In particular, with reference to FIG. 2, an unrolled data sampler that assumes the previous bit is a 1, such as first data sampler 270, will have its data sampler level 405 be located at +A1 mV and a data sampler that assumes the previous bit is a 0, such as second data sampler 272, will have its data sampler level 405 located at −A1 mV. The DFE coefficients for the subsequent taps for the N-tap DFE have random signs, but their values are not relevant for determining the sampler drift compensation values of the present invention. In particular, while the first tap of the speculative DFE 120 is unrolled into two data samplers, the other taps of the DFE are subtracted from the input waveform. The subtracted amount is referred to as the DFE correction and is determined as (A2*$D(n-2)$+A3*$D(n-3)$+A4*$D(n-4)$ ... ). A2 and higher DFE coefficients are randomly positive or negative values, depending upon the transmission channel. Note also that a received bit of 1 means that the D value used for the DFE multiplication is +1, and a received bit of 0 means that the D value used for DFE multiplication is −1.

In an exemplary embodiment of the operation of the off-data filter 230, it is assumed that a data sampler level 405 of first data sampler 274 of a data sampler pair 275 is located at a positive voltage (logic "1") and a data sampler level 405 of second data sampler 276 of the data sampler pair 275 is located at a negative voltage (logic "0"). At a time (n+1), if the previous bit at time (n), was a logic "1" then the A1 DFE coefficient at time (n+1) is a positive voltage. If the previous bit at time (n), was a logic "0" then the A1 DFE coefficient at time (n+1) is a negative voltage. In general, a positive voltage, such as +A1, is an adapted value by the system (as are A2 ... An) of subsequent taps. It is known that the longer the transmission channel, the higher the insertion loss and the higher the value of A1.

FIG. 5A-FIG. 5D further illustrate how the off-data values are filtered to identify and remove the off-data values that are not considered to be useful for determining the drift compensation values. FIG. 5A-FIG. 5D illustrate four possible sampling levels for the data sampler based upon the combination of the logic values of the previously received bit and the currently sampled bit. In this exemplary embodiment, the dashed center line is positioned at 0V 505, the first data sampler (SPn) assumes that the previously received bit was a logic "1" and its sampling level is located at +A1 mV 510, and the second data sampler (SMn) assumes that the previously received bit was a logic "0" and its sampling level is located at −A1 mV 515. Thus, in FIG. 5A-FIG. 5D, implemented on data sampler pair 275, where first data sampler 274 has its sampling level at +A1 mV 510 and second data sampler 276 has its sampling level at −A1 mV 515, it is assumed that the first data sampler (SPn) with sampling level 510 samples the received input signal assuming that the previously received bit is a logic "1" and the second data sampler (SMn) with sampling level 515 samples the received input signal assuming that the previously received bit is a logic "0". The value of the previously received bit $D(n-1)$ and the value of the current bit $D(n)$ determine the condition of the received signal. The full state of the signal is represented by four possible cases, which includes two time instances and two possible states for each time instance. FIG. 5A-FIG. 5D illustrate the general shape of the received waveform for the four possible cases.

Figure 5B:
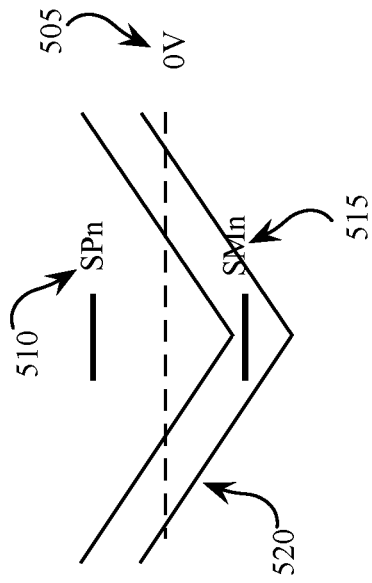
FIG. 5B is diagram illustrating a receiver eye and sampling levels for determining if the off-data values are considered to be useful for determining the drift compensation values, wherein the logic value of the previously received bit is a 1 and the logic value of the currently sampled bit is a logic 0, in accordance with an embodiment of the present invention.
Figure 5D:
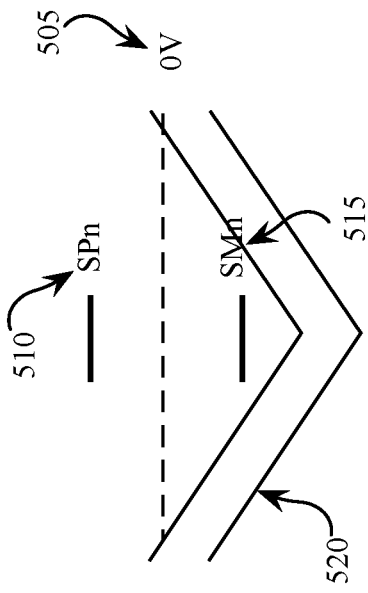
FIG. 5D is diagram illustrating a receiver eye and sampling levels for determining if the off-data values are considered to be useful for determining the drift compensation values, wherein the logic value of the previously received bit is a 0 and the logic value of the currently sampled bit is a logic 0, in accordance with an embodiment of the present invention.
Figure 5A:
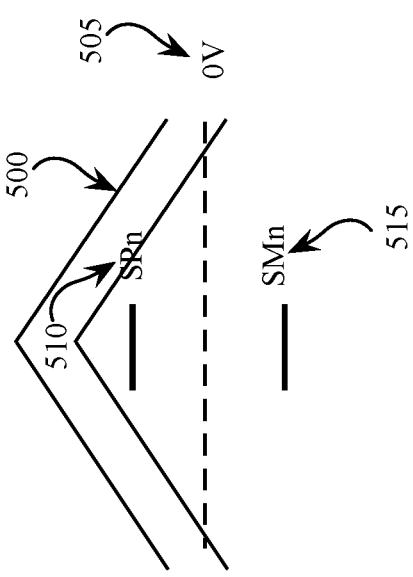
FIG. 5A is diagram illustrating a receiver eye and sampling levels for determining if the off-data values are considered to be useful for determining the drift compensation values, wherein the logic value of the previously received bit is a 1 and the logic value of the currently sampled bit is a logic 1, in accordance with an embodiment of the present invention.

FIG. 5A assumes that a previously received bit value $D(n-1)$ was determined to be a logic "1". In this case, the current data value $D(n)$ of the first data sampler (SPn) with sampling level 510 is selected because the previously received bit $D(n-1)$ was determined to be a logic "1". As shown, the upper eye 500 of the received input signal resides above the first data sampler (SPn) with sampling level 510 and therefore, by definition, it is also above the second data sampler (SMn) with sampling level 515. Accordingly, in the case where previously received bit ($D(n-1)$) was a logic "1" and the current bit ($D(n)$) is determined to be a logic "1", the off-data from the second data sampler (SMn) with sampling level 515 does not provide any useful statistical information regarding sampler drifting to contribute to the determination of the drift compensation values 150. In general, for most interesting conditions where a DFE is required, the off-data from the second data sampler (SMn) with sampling level 515 does not provide any useful statistical information since it is not within the upper eye of the received input signal (i.e. 410 of FIG. 4). When the first data sampler (SPn) with sampling level 510 reports a logic value of "1", given a sampling location of +A1 mV, then the second data sampler (SMn) 515 will also report a logic value of "1" since SMn is at a lower voltage compared to SPn. For example, assuming that the sampling level 510 of first data sampler (SPn) is at +A1 mV and A1 is equal to 50 mV, then it follows that sampling level 515 of second data sampler (SMn) is at a negative voltage of −50 mV. If the first data sampler (SPn) with sampling level 510 reports a logic value of "1" for the received bit, indicating that the voltage level of the bit is greater than 50 mV, then it follows that the voltage level of the bit is also greater than −50 mV. As such, when the previously received bit is a logic "1", the second data sampler (SMn) with sampling level 515 will always report a logic "1" when the first data sampler (SPn) with sampling level 510 reports a logic "1" and therefore the off-data from the second data sampler (SMn) with sampling level 515 does not provide any useful statistical information regarding sampler drifting to contribute to the determination of the drift compensation values 150.

FIG. 5B assumes that a previously received bit value $D(n-1)$ was a logic "1". In this case, the current data value $D(n)$ of the first data sampler (SPn) with sampling level 510 is selected because the previously received bit $D(n-1)$ was determined to be a logic "1". As shown, the sampling level 515 of second sampler (SMn) resides in the lower eye 520 of the received signal, which is typically the case for a high-speed link where DFE is required. Accordingly, in the case where bit D(n−1)=1 and bit D(n)=0, the off-data from the second data sampler (SMn) with sampling level 515 does contain useful information that can contribute to the determination of the drift compensation values 150. For example, again assuming that A1 is equal to 50 mV, when the first data sampler (SPn) with sampling level 510 is selected because the previously received bit was determined to be a logic "1", and the first data sampler (SPn) with sampling level 510 reports that the received bit is a logic "0", then the received bit is known to be less than 50 mV. As such, while it is known that the voltage level of the received bit is below the sampling level 510 of the first data sampler (SPn) (+50 mV), the second data sampler (SMn) with sampling level 515 may report either a logic "1" or a logic "0", depending upon the voltage level of the received bit as sampled by the second data sampler (SMn) with sampling level 515. Therefore, the result provided by the second sampler (SMn) with sampling level 515 indicates the voltage level of the received bit relative to −50 mV, thereby providing useful information that can contribute to the determination of the drift compensation values 150.

Figure 5C:
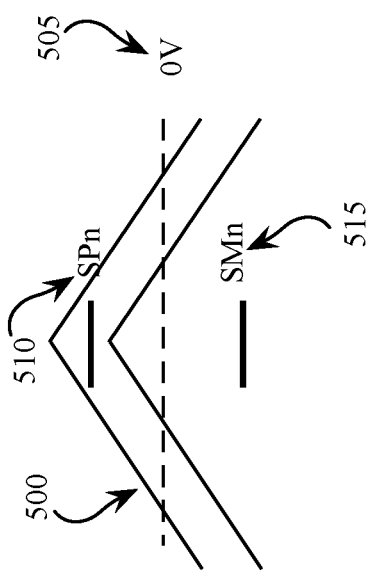
FIG. 5C is diagram illustrating a receiver eye and sampling levels for determining if the off-data values are considered to be useful for determining the drift compensation values, wherein the logic value of the previously received bit is a 0 and the logic value of the currently sampled bit is a logic 1, in accordance with an embodiment of the present invention.

FIG. 5C assumes that a previously received bit value D(n−1) was a logic "0". In this case, the second data sampler (SMn) with sampling level 515 is selected as the data sampler for D(n). As shown, the sampling level 510 of first data sampler (SPn) resides in the upper eye 500 of the received signal which is typically the case for a high-speed link where DFE is required. Accordingly, in the case where bit D(n−1)=0 and bit D(n)=1, the off-data from the first data sampler (SPn) with sampling level 510 does contain useful information that can contribute to the determination of the drift compensation values. For example, again assuming that A1 is equal to 50 mV, when the second data sampler (SMn) with sampling level 515 is selected because the previously received bit was determined to be a logic "0", and the second data sampler (SMn) with sampling level 515 reports that the received bit is a logic "1", then the received bit is known to be greater than −50 mV. As such, while it is known that the voltage level of the received bit is above the sampling level 515 of the second data sampler (SMn) (−50 mV), the first data sampler (SPn) with sampling level 510 may report either a logic "1" or a logic "0", depending upon the voltage level of the received bit as sampled by the first data sampler (SPn) with sampling level 510. Therefore, the result provided by the first sampler (SPn) with sampling level 510 indicates the voltage level of the received bit relative to 50 mV, thereby providing useful information that can contribute to the determination of the drift compensation values 150.

FIG. 5D assumes that a previously received bit value D(n−1) was a logic "0". In this case, the second data sampler (SMn) with sampling level 515 is selected as the data sampler for D(n), however, as shown, if the second data sampler (SMn) with sampling level 515 reports a logic zero the first data sampler (SPn) with sampling level 510 would also report a logic "0" because its sampling level 510 is at an even higher voltage as compared to the second data sampler (SMn) with sampling level 515. Accordingly, in the case where bit D(n−1)=0 and bit D(n)=0, the off-data from the first data sampler (SPn) with sampling level 510 does not provide any useful information to contribute to the determination of the drift compensation values 150. In other words, when the second sampler (SMn) with sampling level 515 reports a logic value of "0", given a sampling location of −A1 mV, then the first data sampler (SPn) with sampling level 510 will also report a logic value of "0" since the sampling level 510 of the first data sampler (SPn) is at a higher voltage compared to the sampling level 515 of the second date sampler (SMn). For example, assuming again that the sampling level 510 of first data sampler (SPn) is at +A1 mV and A1 is equal to 50 mV, then it follows that sampling level 515 of second data sampler (SMn) is at a negative voltage of −50 mV. When the second data sampler (SMn) with sampling level 515 is selected because the previously received bit was determined to be a logic "0", and the second data sampler (SMn) with sampling level 515 reports a logic value of "0" for the received bit, indicating that the voltage level of the bit is less than −50 mV, then it follows that the voltage level of the bit is also less than +50 mV. As such, when the previously received bit is a logic "0", the first data sampler (SPn) with sampling level 510 will always report a logic "0" when the second data sampler (SMn) with sampling level 515 reports a logic "0" and therefore the off-data from the first data sampler (SPn) with sampling level 510 does not provide any useful statistical information regarding sampler drifting to contribute to the determination of the drift compensation values 150.

For off-data values to be useful, the received input signal should be positioned between the respective data sampler levels of the two data samplers of the data sampler pairs. The table below summarizes the results of the operation of the off-data filter 230, wherein the locations indicated as "off-data not useful" are filtered from the off-data samples by the off-data filter 230 prior to computing the drift compensation values 150.

| Reference FIG. | Bit D(n−1) | Bit D(n) | First Data Sampler (SPn) | Second Data Sampler (SMn) |
|---|---|---|---|---|
| FIG. 5A | 1 | 1 | D(n) | Off-Data Not Useful |
| FIG. 5B | 1 | 0 | D(n) | Off-Data Useful |
| FIG. 5C | 0 | 1 | Off-Data Useful | D(n) |
| FIG. 5D | 0 | 0 | Off-Data Not Useful | D(n) |

As described with reference to FIGS. 5A-5D and summarized in the table above, each data sampler 270, 272, 274, 276, 280, 282, 284, 286 of the speculative DFE 120 will produce a useful off-data value one quarter of the time, while each data sampler 270, 272, 274, 276, 280, 282, 284, 286 is used as the data sampler for half of the time. In other words, each of the data samplers 270, 272, 274, 276, 280, 282, 284, 286 are off-data samplers having respective off-data sampling levels to provide useful off-data values one quarter of the time.

In the present invention, the off-data values collected by the data samplers 270, 272, 274, 276, 280, 282, 284, 286 that would normally be discarded by the speculative DFE 120, are instead used to compensate for any drift experienced by the data samplers 270, 272, 274, 276, 280, 282, 284, 286. The off-data values are periodically passed to the drift compensation engine 125 to determine the drift compensation values 150. Since the data sampler drift that is being tracked is a low-frequency event, it is not necessary that the off-data values be provided to the drift compensation engine 125 at the full data-rate. While the off-data samples are provided from each pair of data samplers, it is not necessary to provide all of the off-data samples from the data samplers to the drift compensation engine 125. Since the drift that is being compensated for using the off-data values is a slow-moving drift, the complete set of off-data samples is not necessary to determine the drift compensation values. Additionally, the drift compensation engine 125 may not always be running. In some instances, such as when the eye is known to be large or it is known that the voltage-temperature (VT) conditions are stable, the drift compensation engine 125 may be disabled to save power. Alternatively, the drift compensation engine 125 may only be enabled periodically, thereby conserving power.

As shown with reference to FIG. 2, the drift compensation engine 125 may further include a counter 238 to assist in the computation of the drift compensation values 150. After the off-data values have been received at the drift compensation engine 125 and filtered by the off-data filter 230, to determine the drift compensation values 150 for each of the data samplers 270, 272, 274, 276, 280, 282, 284, 286, a one-zero bias value is determined for each of the data samplers 270, 272, 274, 276, 280, 282, 284, 286. To determine the one-zero bias values, a period of time over which the one-zero bias values will be determined is first selected. The time period may be selected by a designer of the system as a control parameter to the algorithm for computing the drift compensation values 150. The designer may set the time period of the one-zero bias determination in addition to determining how often the drift compensation values 150 is computed. The control parameter may be configured through control registers of the speculative DFE 120 and can be adjusted and updated as necessary until a final fixed value for the time period is determined through appropriate testing of the speculative DFE 120. For example, a selected time period may be implemented by the counter 238 counting a period of 1e3 to 1e6 unit intervals (UI). In reference to SerDes, unit interval (UI) refers to the amount of time allocated for one bit for a given data rate of operation. During the determined period of time, off-data values are tracked for each of the data samplers. In general, the counter 238 for each data sampler counts in a first direction when the off-data value from the data sampler is a logic "1" and counts in a second direction, opposite the first direction, when the off-data value from the data sampler is a logic "0". In a particular embodiment, the counter 238 for each data sample may count up when the off-data value from the data sampler is a logic "1" and may count down when the off-data value from the sampler is a logic "0". After the period of time has elapsed, a one-zero bias value for each data sampler is determined to be a value that is representative of the number of 1's counted versus the number of 0's. For example, if the one-zero bias value is determined to be zero, then it is known that the probability of 1's and 0's at that data sampler are equal. However, if off-data values were counted as 60% 1's and 40% 0's, then it would be known that the probability of the respective data sampler providing a converted analog input signal as a logic "1" is 20% more likely than the respective data sampler providing a converted analog input signal as a logic "0", during the determined time period. In general, during the time period, a positive one-zero bias value means that 1's are more common that 0's, a negative one-zero bias value means that 0's are more common than 1's and a zero one-zero bias value means that the number of 1's is equal to the number of 0's. The magnitude of the one-zero bias value indicates the difference between the two values, wherein a large bias between 1's and 0's leads to a larger one-zero bias value. It is noted that, the absolute value of the one-zero bias value is not critical, instead what is important to the drift compensation is that each of the data samplers exhibits essentially the same one-zero bias value after trimming, to be described below.

After the one-zero bias values are determined for each of the data samplers, 270, 272, 274, 276, 280, 282, 284, 286 a one-zero bias target value is determined. While various methods may be used to determine the one-zero bias target values from the one-zero bias values of the data samplers 270, 272, 274, 276, 280, 282, 284, 286, in one embodiment, the one-zero bias values of each of the data samplers 270, 272, 274, 276, 280, 282, 284, 286 are averaged to determine the one-zero bias target value. All of the data samplers 270, 272, 274, 276, 280, 282, 284, 286 will then be subsequently trimmed towards this one-zero bias target value. Accordingly, a data sampler that has a one-zero bias that is higher than the one-zero bias target value, meaning that the data sampler is generating too many logic "1s", needs to have its respective data sampling level increased. Conversely, if a data sampler has a one-zero bias that is lower than the one-zero bias target value, then that respective data sampling level needs to be decreased. As such, a drift compensation value for each of the data samplers is computed by the drift compensation engine 125 based upon the one-zero bias value for each individual data sampler and the one-zero bias target value determined for all the data samplers of the speculative DFE 120. The drift compensation values 150 are respectively used to increase or decrease the respective data sampling level of the individual data samplers so that all of the data samplers 270, 272, 274, 276, 280, 282, 284, 286 are trimmed towards the zero-bias target value. For example, a difference between the zero-bias target value the zero-bias value of one of the data samplers may indicate that the data sampling level of the data sampler should be increased or decreased to correct for the dynamic drift due to changing VT conditions. The drift compensation value indicates whether the sampling level of the data sampler should be moved up or down. As such, the sampling level of the data sampler is adjusted up or down by a single step in the direction indicated by the drift compensation value. The magnitude of the step is specific to a given implementation. In a particular embodiment, the magnitude of the step may be 0.5 mV, 1 mV or 2 mV. An ideal sampling level for each of the data samplers will be approached over a number of time periods by performing adjustments to the sampling level of the data sampler based upon the drift compensation value. By alternately performing upward and downward adjustments, the sampling level of the data sampler will be trimmed to the ideal position for the current VT condition. While the use of a single uniform step is described above, it is not meant to be limiting in any way, the use of steps whose size varies responsive the absolute value of the difference between the one-zero bias and the one-zero bias target value is specifically contemplated.

With reference again to FIG. 2, the drift compensation engine 125 further includes a digital-to-analog (DAC) register 235 to store the drift compensation values 150. In accordance with the drift compensation values 150, the increases or decreases in the data sampling level of the data samplers 270, 272, 274, 276, 280, 282, 284, 286 are accomplished using a 1 LSB step on the DAC register 235 that stores the drift compensation values 150. After the drift compensation values 150 are stored in the DAC register 235, the one-zero bias values for the data samplers 270, 272, 274, 276, 280, 282, 284, 286 and the counter 238 are reset and the procedure for generating new drift compensation values begins again.

The DAC register 235 keeps track of the current data sampling level being applied to each data sampler and in response to increase/decrease updates from the drift compensation engine 125, adjusts the data sampling level of each data sampler 270, 272, 274, 276, 280, 282, 284, 286 by adding or subtracting one LSB from the currently presented value.

FIG. 6 is a flow diagram of a method 600 for data sampler drift compensation, in accordance with an embodiment of the present invention. At operation 605, the method includes receiving, at a drift compensation engine, off-data values from a plurality of data sampler pairs of a speculative decision feedback equalizer (DFE) in a SerDes receiver. With reference to FIG. 2, in the present invention, the data value selectors 260, 262, 264, 266 of the first speculative tap 122 provide the off-data values 240, 242, 244, 246 to the drift compensation engine 125.

At operation 610, the method 600 continues by generating, by the drift compensation engine, a drift compensation value for each of the data samplers based upon the off-data values received from each of the plurality of data value selectors. With reference to FIG. 2, the drift compensation engine 125 generates the respective drift compensation values 150 for each of the data samplers 270, 272, 274, 276, 280, 282, 284, 286 of the data sampler pairs 271, 275, 281, 285 of the first speculative tap 122 of the speculative DFE 120.

Figure 7:
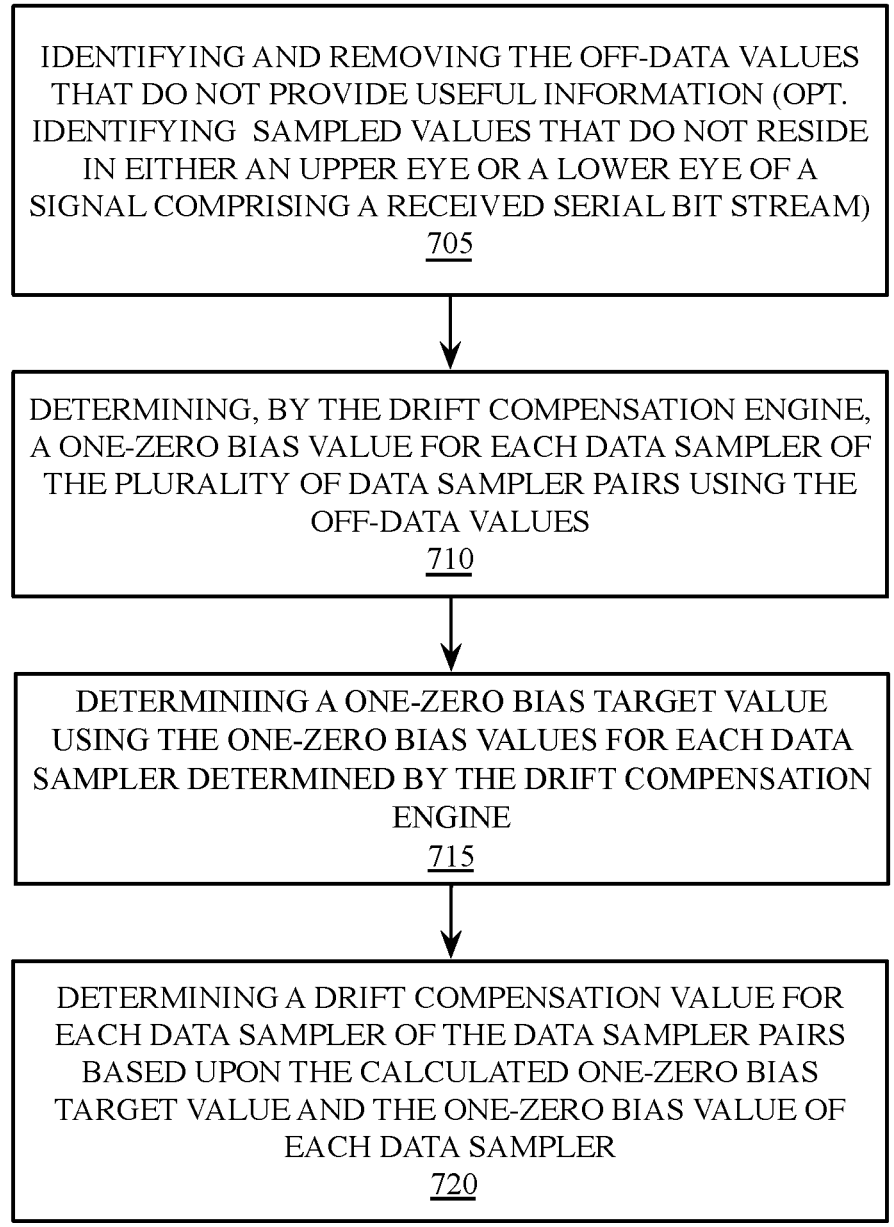
FIG. 7 is a flow diagram illustrating a method for identifying and removing the off-data values that do not provide useful information for determining the drift compensation values, in accordance with an embodiment of the present invention.

With reference to FIG. 7, prior to performing operation 610 of FIG. 6 for generating the drift compensation values, operation 705 of the method 700 may further include identifying and removing the off-data values that do not provide useful information. With reference to FIG. 2, in the present invention, the data samplers 270, 272, 274, 276, 280, 282, 284, 286 of the data sampler pairs 271, 275, 281, 285 and the off-data filter 230 may be used to identify and remove the off-data values that do not provide useful information.

At operation 710, the method 700 may continue by determining, by the drift compensation engine, a one-zero bias value for each data sampler of the plurality of data sampler pairs using the off-data values. With reference to FIG. 2, in the present invention, the drift compensation engine 125 uses the off-data filter 230 and the counter 238 to determine the a one-zero bias value for each of the data samplers 270, 272, 274, 276, 280, 282, 284, 286 of the data sampler pairs 271, 275, 281, 285 of the speculative DFE 120.

At operation 715, the method 700 may continue by computing a one-zero bias target value using the one-zero bias values for each data sampler determined by the drift compensation engine 125. With reference to FIG. 2, in the present invention, the drift compensation engine 125 is configured to determine the one-zero bias target value for the data samplers 270, 272, 274, 276, 280, 282, 284, 286.

At operation 720, the method 700 continues by generating the drift compensation value for each data sampler of the data sampler pairs based upon the determined one-zero bias target value and the one-zero bias value of each data sampler. With reference to FIG. 2, in the present invention, the drift compensation engine 125 is configured to generate (which may be done by computing) the drift compensation value for each data samplers of the data sampler pairs based upon the determined one-zero bias target value and the one-zero bias value of each data sampler 270, 272, 274, 276, 280, 282, 284, 286.

With reference to FIG. 8, when operation 710 of FIG. 7 is performed for determining a one-zero bias value for each data sampler of the plurality of data sampler pairs using the off-data values, operation 805 of the method 800 may further include, defining a period over which the one-zero bias value will be determined, followed by operation 810 of the method 800 which includes tracking the off-data values over the defined period by counting in a first direction when the received off-data value is a logic level 1 and counting in a second direction, opposite the first direction, when the received off-data value is a logic level 0 to determine the one-zero bias value for each data sampler. At operation 815, the method continues by averaging the one-zero bias values for each of the data samplers. At operation 820, the method concludes by adjusting a sampling level of one or more of the data samplers based upon the drift compensation value generated for each of the data samplers, wherein the drift compensation value indicates an increase in the sampling level of the data sampler if the one-zero bias of the data sampler is higher than the one-zero bias target value and the drift compensation value indicates a decrease in the sampling level of the data sampler if the one-zero bias of the data sampler is lower than the one-zero bias target value.

As such, the present invention provides an improved system and method for compensating for drift in data sampler sampling levels resulting from dynamic VT changes during operation of a SerDes receiver.

In one embodiment, portions of the SerDes receiver may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What is claimed is:

1. A method for data sampler drift compensation in a serializer/deserializer (SerDes) receiver, the method comprising:
   receiving, at a drift compensation engine, off-data values from a plurality of data value selectors, each one of the plurality of data value selectors coupled to one of a plurality of data sampler pairs of a speculative Decision Feedback Equalizer (DFE) in a SerDes receiver; and
   generating, by the drift compensation engine, a drift compensation value for each data sampler of the data sampler pairs based upon the off-data values received from each of the plurality of data value selectors.

2. The method of claim 1, wherein generating, by the drift compensation, the drift compensation value for each data sampler of the data sampler pairs further comprises:
   determining, by the drift compensation engine, a one-zero bias value for each data sampler of the plurality of data sampler pairs using the off-data values;
   determining a one-zero bias target value using the determined one-zero bias values for each data sampler determined by the drift compensation engine; and
   generating the drift compensation value for each data sampler of the data sampler pairs based upon the determined one-zero bias target value and the determined one-zero bias value of each data sampler.

3. The method of claim 2, further comprising, removing off-data values that do not provide useful information for determining the one-zero bias value prior to determining the one-zero bias value.

4. The method of claim 3, further comprising, identifying the off-data values that do not provide useful information for determining the one-zero bias value as being sampled values that do not reside in either an upper eye or a lower eye of a signal comprising a received serial bit stream.

5. The method of claim 2, wherein the determining, by the drift compensation engine, the one-zero bias value for each data sampler of the plurality of data samplers using the off-data values comprises:
   defining a period over which the one-zero bias value will be determined; and
   tracking the off-data values over the defined period by counting in a first direction when the received off-data value is a logic level 1 and counting in a second direction, opposite the first direction, when the received off-data value is a logic level 0 to determine the one-zero bias value for each data sampler.

6. The method of claim 2, wherein determining the one-zero bias target value using the determined one-zero bias values for each data sampler comprises, averaging the one-zero bias values of each of the data samplers.

7. The method of claim 2, further comprising:
adjusting a sampling level of one or more of the data samplers based upon the generated drift compensation value generated for each of the data samplers, wherein the drift compensation value indicates an increase in the sampling level of the data sampler if the determined one-zero bias of the data sampler is higher than the determined one-zero bias target value and the drift compensation value indicates a decrease in the sampling level of the data sampler if the determined one-zero bias of the data sampler is lower than the determined one-zero bias target value.

8. The method of claim 1, further comprising:
receiving, at one of the plurality of data value selectors, speculative data values of a serial bit stream from the data sampler pair coupled to the data value selector;
receiving a previous bit value of the serial bit stream at the one of the plurality of data value selectors; and
identifying, at the data value selector, the off-data values from the speculative data values and the received previous bit value.

9. The method of claim 1, further comprising:
generating speculative data values from a serial bit stream received at a first data sampler pair, wherein a first one of the data samplers of the first data sampler pair generates a speculative data value under the assumption that a previous bit value from the serial bit stream is a logic level 1 and a second data sampler of the first data sampler pair generates a speculative data value under the assumption that the previous bit value from the serial bit stream is a logic level 0;
determining, by a first data value selector coupled to the first data sampler pair, that the speculative data value generated by the first data sampler of the first data sampler pair is the off-data value when it is determined that the previous bit value from the serial bit stream was a logic level 0 and determining that the speculative data value generated by the second data sampler of the first data sampler pair is the off-data value when it is determined that the previous bit value from the serial bit stream is a logic level 1; and
passing the off-data values from the first data value selector to the drift compensation engine.

10. The method of claim 9, further comprising:
determining, by the first data value selector, that the speculative data value generated by the first data sampler of the first data sampler pair is a data value if the previous bit value is equal to a logic level 1 and determining that the speculative data value generated by the second data sampler of the first data sampler pair is the data value if the previous bit value is equal to logic level 0; and
passing the data value to a next data value selector of the speculative DFE.

11. The method of claim 1, further comprising, storing the drift compensation value for each of the plurality of data sampler pairs in a digital-to-analog converter (DAC) register coupled to the data samplers of the speculative DFE.

12. The method of claim 1, wherein the plurality of data value selectors are each from a speculative first tap of the speculative Decision Feedback Equalizer (DFE) in the SerDes receiver.

13. A system for data sampler drift compensation in a Serializer/Deserializer (SerDes) receiver, the system comprising:

a plurality of data value selectors, wherein each one of the plurality of data value selectors are coupled to one of a plurality of data sampler pairs of a speculative Decision Feedback Equalizer (DFE) in a SerDes receiver, the plurality of data value selectors to identify off-data values from speculative data values provided by the data sampler pairs; and
a drift compensation engine coupled to the plurality of data value selectors, the drift compensation engine to;
receive the off-data values from the plurality of data value selectors; and
generate a drift compensation value for each of data sampler of the plurality of data sampler pairs based upon the off-data values received from each of the plurality of data value selectors.

14. The system of claim 13, wherein the drift compensation engine is further to:
determine a one-zero bias value for each data sampler of the plurality of data sampler pairs using the off-data values;
determine a one-zero bias target value using the determined one-zero bias values for each data sampler of the data sampler pairs; and
generate the drift compensation value for each data sampler of the data sampler pairs based upon the determined one-zero bias target value and the determined one-zero bias value of each data sampler of the data sampler pairs.

15. The system of claim 14, wherein the drift compensation engine further comprises an off-data filter to remove the off-data values that do not provide useful information for determining the one-zero bias value for each data sampler prior to the drift compensation engine determining the one-zero bias value for each data sampler.

16. The system of claim 14, wherein the drift compensation engine is further configured to:
define a period over which the one-zero bias value will be determined; and
track the off-data values over the defined period by counting in a first direction when the received off-data value is a logic level 1 and counting in a second direction, opposite the first direction, when the received off-data value is a logic level 0 to determine the one-zero bias value for each data sampler.

17. The system of claim 14, wherein the drift compensation engine is further configured to determine the one-zero bias target value using the one-zero bias values for each data sampler by averaging the one-zero bias values of each of the data samplers.

18. The system of claim 13, wherein each of the data value selectors further comprises:
a first multiplexer circuit for identifying data values from speculative data values of a serial bit stream received from a data sampler pair coupled to the data value selector and a previous bit value of the serial bit stream; and
a second multiplexer circuit for identifying the off-data values from the speculative data values of the serial bit stream received from the data sampler pair coupled to the data value selector and the previous bit value of the serial bit stream.

19. The system of claim 13, wherein each one of the plurality of data sampler pairs of the speculative DFE are configured to:
generate speculative data values from a sample of a serial bit stream received at a first data sampler pair of the plurality of data sampler pairs, wherein a first one of the data samplers of the first data sampler pair generates a speculative data value under the assumption that a previous bit value from the serial bit stream is a logic level 1 and a second data sampler of the first data sampler pair generates a speculative data value under the assumption that the previous bit value from the serial bit stream is a logic level 0; and wherein a first data value selector coupled to the first data sampler pair is configured to determine that the speculative data value generated by the first data sampler of the first data sampler pair is the off-data value when it is determined that the previous bit value from the serial bit stream was a logic level 0 and, to determine that the speculative data value generated by the second data sampler of the first data sampler pair is the off-data value when it is determined that the previous bit value from the serial bit stream is a logic level 1.

20. The system of claim 13, wherein the drift compensation engine further comprises a digital-analog-converter (DAC) register for storing the drift compensation values for each of the plurality of data samplers and the speculative DFE of the SerDes receiver and wherein the DAC register adjusts a sampling level of one or more of the data samplers of the plurality of data sampler pairs based upon the drift compensation value stored for each of the data samplers, wherein the drift compensation value indicates an increase in the sampling level of the data sampler if the one-zero bias of the data sampler is higher than the one-zero bias target value and the drift compensation value indicates a decrease in the sampling level of the data sampler if the one-zero bias of the data sampler is lower than the one-zero bias target value.

21. The system of claim 13, wherein the plurality of data value selectors are each from a speculative first tap of the speculative Decision Feedback Equalizer (DFE) in the SerDes receiver.

22. A system for data sampler drift compensation in a Serializer/Deserializer (SerDes) receiver, the system comprising:

a speculative Decision Feedback Equalizer (DFE) of a SerDes receiver, the speculative DFE comprising a plurality of data sampler pairs and a data sampler selector coupled to each of the plurality of data sampler pairs; and a drift compensation engine coupled to the SerDes receiver, the drift compensation engine to receive off-data values from the data sampler selectors and to provide a drift compensation value to each data sampler of the plurality of data sampler pairs of the DFE, wherein the drift compensation value is based upon the speculative data values received from the data sampler selectors;

the SerDes receiver to adjust a sampling voltage of each of the data samplers of the plurality of data sampler pairs of the DFE based upon the drift compensation value from the drift compensation engine.

* * * * *